Oct. 22, 1929.                    E. O. HILLER                    1,732,305
                          GLASS SEVERING MECHANISM
                            Filed July 15, 1925
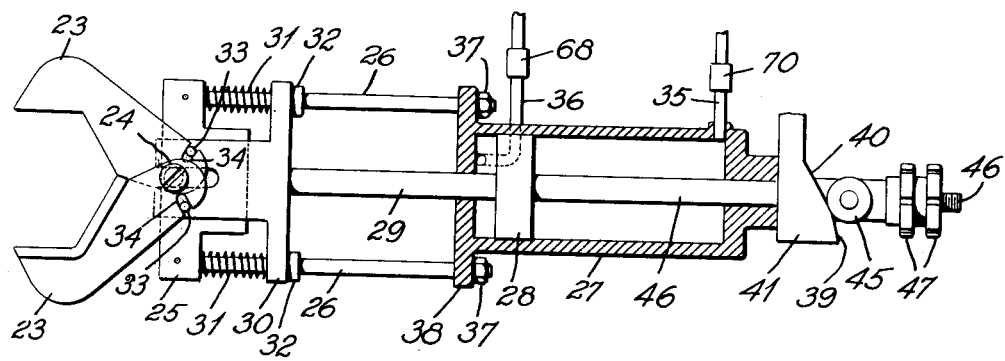
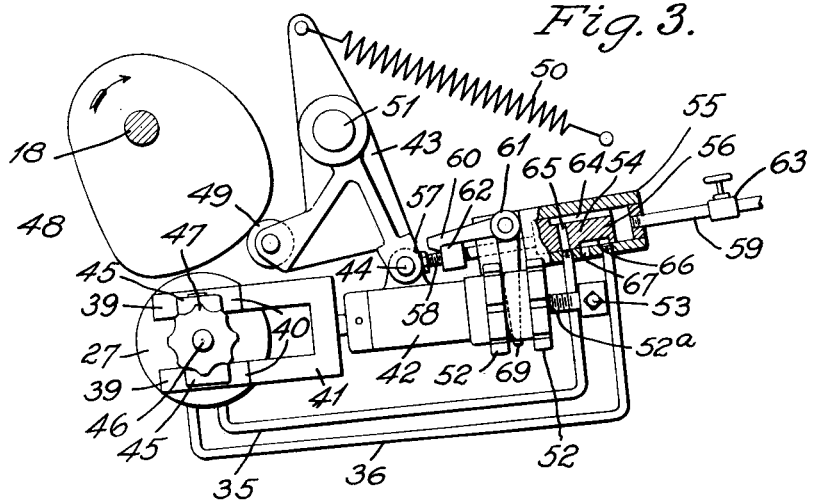
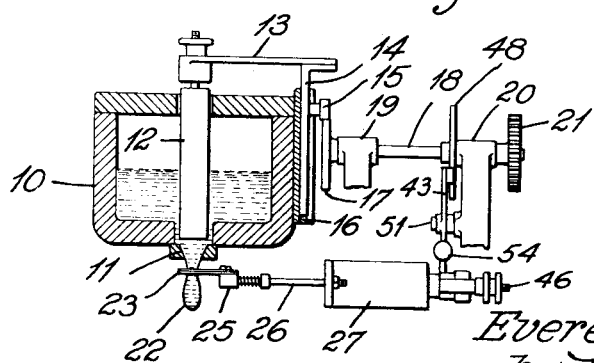
Inventor:
Everett O. Hiller
by Robson D Brown
Att'y.

Patented Oct. 22, 1929

1,732,305

UNITED STATES PATENT OFFICE

EVERETT O. HILLER, OF HARTFORD, CONNECTICUT, ASSIGNOR TO HARTFORD-EMPIRE COMPANY, OF HARTFORD, CONNECTICUT, A CORPORATION OF DELAWARE

GLASS-SEVERING MECHANISM

Application filed July 15, 1925. Serial No. 43,750.

My invention relates to pneumatically operated shears for use in severing mold charges of molten glass delivered by glass feeding machines.

The object of this invention is to provide a mechanical control for fluid-pressure operated glass shears, whereby definite adjustable mechanical means shall be employed for controlling the time and the speed at which the shears are closed by fluid pressure after being advanced by fluid pressure to the proper shearing position.

In a well-known type of pneumatically operated glass shears, the shears are reciprocated toward and from cutting position by an air-operated piston. As the shears approach the end of their inward stroke, further advancing movement is prevented by suitable stops, and the final inward movement of the actuating piston causes the shears to close.

With this construction it has been impossible to adjust the speed of the shears during their cutting movement without altering the speed of their reciprocating movement to and from the severing position, or conversely, to alter the reciprocating speed without changing the cutting speed. Moreover, any variation in the fluid pressure or in the friction between the operating parts will cause the shears to close earlier or later.

To overcome these difficulties and to produce a simple and efficient mechanism I use, in combination with the usual fluid pressure arrangement for reciprocating and closing the shears, a mechanical control for the shear-closing movement capable of adjustment so that the time and the speed of the closing may be varied, thus insuring an accurate and adjustable time of closing relative to the cycle of the feeding machine, and irrespective of variations in the time of reciprocation of the shear-carrying head. The adjustment of the phase relation between the cycle of the machine and the severing time may be made during the operation of the machine.

In the accompanying drawing:

Figure 1 is a diagrammatic view of a glass feeding machine, including a shearing mechanism of the type to which my present invention relates;

Fig. 2 is a plan view of the shearing mechanism with parts in section; and

Fig. 3 is a right-end elevation of the structure shown in Fig. 2, showing also the shear-controlling elements.

Referring to the drawing, the numeral 10 indicates a container for molten glass which may be a forehearth connected to a glass furnace. The container 10 has an orifice 11 formed in its bottom, through which mold charges of molten glass are periodically fed under the control of a plunger 12 that is supported, guided and reciprocated in any suitable manner. As shown, the plunger 12 is secured to an overhanging arm 13 which is attached to a vertically reciprocating slide 14 carrying a cam roll 15 and operating in a slideway 16 formed on the side of the container 10.

The plunger 12 is raised and lowered in regular cycles to control the discharge of glass through the orifice 11 by means of the engagement of the cam roll 15 with a cam 17 mounted on a shaft 18 that is supported in bearings 19 and 20 and is driven by a gear 21.

For the purpose of severing mold charges 22 from the molten glass issuing from the orifice 11, shear blades 23 are periodically reciprocated to and from the shearing position shown in Fig. 1. The shear blades 23 are pivoted on a stud 24, Fig. 2, secured to a head 25 that is carried by rods 26 slidably mounted in bearing openings formed in the flanged end of a fluid pressure cylinder 27. A piston 28 operates within the cylinder 27 and is secured to a piston rod 29 that carries on its forward end a yoke 30 which is slidably mounted on the head 25 and on the rods 26. Compression springs 31 are interposed between the yoke 30 and the head 25 to retain the head and the yoke normally in the relative position shown in Fig. 1, in which position the shears are open. The rearward movement of the head 25 is limited by stop collars 32 secured to the rods 26. Pins 33 are secured in the yoke 30 in a position to engage slots 34 formed in the shear blades 23 to close and open the shears when the yoke is advanced and retracted with respect to the head. Fluid pressure is supplied to and exhausted from the cylinder 27 through pipes 35 and 36.

After the piston has carried the shears and their associated parts to the shearing position shown in Fig. 1, the engagement of adjustable stop nuts 37 with the flange 38 of the cylinder 27 stops the forward movement of the head 25 on which the blades 23 are pivoted, while the yoke 30 which is attached to the piston rod 29 is forced forward by the piston 28, thereby closing the shears by the engagement of the pins 33 with the slots 34 in the shear blades. Fluid pressure is then admitted into the front of the cylinder 27 through the pipe 36 and the operation is reversed, the shears opening and then being retracted, along with their associated mechanism, rearwardly out of the heated zone surrounding the feeder orifice.

The construction and operation thus far described are well known in this art and form no part of my present invention, which is concerned with a mechanical control device for timing the closing movement of the shears. This device includes one or more wedge cams interposed in the path of forward movement of a suitable part moving with the piston 28, in such a way that the shears are prevented from closing until a definite instant when the wedge cam is withdrawn and the piston is permitted to close the shears at a controlled rate. In the construction shown in the drawing, I provide two wedge cams having inclined surfaces 39 and 40, these cams being formed on a forked member 41 which is adjustably secured in a bearing 42 that is pivotally suspended from a bell crank cam lever 43 by a stud 44. The cam surfaces of the member 41 extend in front of cam rollers 45 which are mounted on a rod 46 extending from the rear of the piston 28. The lengthwise position of the rollers 45 is adjustable by means of nuts 47.

The cam member 41 is reciprocated periodically across the path of movement of the rollers 45 by means of a cam 48 secured to a suitable shaft, preferably the shaft 18 which drives the plunger of the feeder. The cam 48 engages a cam roll 49 on the lever 43, this roll being held engaged with the cam by a spring 50. Through the action of the cam 48 and the spring 50, the lever 43 is rocked on a supporting stud 51 which is secured to the bearing bracket 20.

The cam member 41 is adjustable lengthwise to position the cam surfaces 40 in the desired location, so as to limit at the proper time, the unrestricted travel of the piston 28, by means of hand nuts 52 operable on a threaded stud 52ª which is adjustably secured in the bearing 42. This stud carries a valve-tripping lug 53, the function of which will be described below.

The piston 28 is operated in timed relation with the feeding machine by a valve 54, which is operated by means of the cam 48 that is secured, as stated above, to the feeder driving shaft. This valve consists of a casing 55 containing a plunger slide valve 56 which is moved to the right, as shown in Fig. 3, by the engagement of a hub 57 on the cam lever 43 with an adjustable valve stem 58 connected to the slide 56, thereby moving the slide, against fluid pressure admitted through a pipe 59 to the right side of the valve 56, until a pawl 60 forming part of a trip lever 61 engages a shoulder 62 adjustably mounted on the valve stem 58 which detains the valve slide 56 in the position shown in Fig. 3 until the pawl is released.

While the valve is in this position, air pressure controlled by a valve 63 in the pipe 59 is transmitted to the rear of the cylinder 27 through the ports 64 and 65 and the pipe 35, and air pressure from the front of the cylinder 27 is exhausted to the atmosphere through the pipe 36 and ports 66 and 67.

In its forward movement to position the shears, the piston 28 has an unrestricted travel, excepting for the back pressure in the front of the piston, which may be regulated by a desired exhaust opening in a check valve 68 provided to regulate the speed of travel of the forward movement of the piston.

When the cam 48 permits the cam lever spring 50 to advance the wedge cam member 41 so as to allow the piston 28 to close the shears, the forward movement of the dog 53 carried at the rearward end of the wedge cam structure engages a trip arm 69 extending from the pawl lever 61, thereby moving the pawl 60 out of engagement with the shoulder 62 and allowing the valve slide 56 to be forced to the left by the fluid pressure entering through the pipe 59. Air under pressure then passes through the pipe 36 to force the piston 28 to the rear, the flow of exhaust air in the cylinder being regulated by a valve 70 in its escape through the pipe 35 to the atmosphere through the ports 66 and 67.

In the operation of the apparatus described above, the cam 48 is properly shaped and timed to actuate the valve slide 54 at the proper time to cause air pressure to advance the piston 28 and the shear structure so as to bring the shears to the shearing position before the instant when severing is to occur. The forward movement of the piston and the shear blades is interrupted by the engagement of the rollers 45 with the cam surfaces 39 of the wedge cam 41, and the shears are thus prevented from closing until the rotary cam 48 permits the spring 50 to rock the bell crank lever 43 on its pivot, thereby moving the wedge cam member 41 to the left as seen in Fig. 3, or downwardly as seen in Fig. 2, thus permitting the piston 28 to resume its forward movement at a rate determined by the rate of movement of the cam member 41 and the shape of the cam surfaces 39 and 40. Since the nuts 37 restrain the head 25 from further movement, this additional forward movement of the piston 28 operates through the yoke 30, the pins 33, and the slots 34 to close the shears. Near the end of the movement of the wedge cam member 41 just described, the trip arm 69 is engaged by the lug 53, whereupon the pawl 60 releases the valve slide 56 and the air pressure is reversed in the cylinder 27, thus withdrawing the head 25 and allowing the shears to open by the action of the compression springs 31.

It will be particularly noted that by suitably designing the cam 48 and the wedge surfaces 39 and 40, and by adjusting the position of the wedge cams with respect to the rollers 45, the closing of the shears may be caused to take place at any desired instant and at any desired speed.

While I have shown and described a construction which is well suited for carrying out my invention, it will be understood that various changes in the construction and arrangement of parts may be made within the scope of the appended claims.

I claim as my invention:

1. Shearing mechanism for glass feeders comprising a pair of shear blades, fluid pressure means for reciprocating and periodically closing said shear blades, means for controlling the operation of said fluid pressure means, and means operated mechanically and periodically for adjustably controlling the time at which said shear blades close without changing the time of commencement of the movements of the shear blades toward the position at which they are to be closed.

2. Shearing mechanism for glass feeders comprising a pair of shear blades, fluid pressure means for reciprocating and closing said shear blades, and means operated mechanically and periodically for controlling the time and the speed at which said shear blades close.

3. Shearing mechanism for glass feeders comprising a pair of shear blades, fluid pressure means for reciprocating and closing said shear blades, a member adapted to interrupt the movement of said fluid-pressure means, and mechanically operated means for moving said interrupting member so as to permit said fluid pressure means to close said shear blades.

4. In combination with a glass feeding device, pneumatically operated shears cooperating therewith, a valve for controlling the admission of fluid pressure to said shear mechanism, mechanical means for interrupting the movement of said shears, and cam-operated means for actuating said valve and for controlling the movement of said interrupter to regulate the closing of said shears.

5. In combination with a glass feeding device operating to deliver successive mold charge masses of glass, a shearing mechanism cooperating therewith, pneumatic means for operating said shearing device, means for controlling the operation of said pneumatic means, a mechanical interrupter in addition to the aforesaid means for positively controlling the closing of said shears and means for synchronizing the movements of said shear operating means with the operations of said feeding device.

6. In combination with a glass feeding device, a glass severing mechanism cooperating therewith, pneumatic means for operating said severing mechanism to position same with respect to the glass feeding device, a mechanically controlled valve for initiating the motion of said severing mechanism, and a mechanically controlled interrupter associated with the pneumatic means for regulating the speed at which the shears are closed without changing the severing position.

7. In combination with a glass feeding device operating to deliver successive mold charge masses of glass, a pair of glass severing shears cooperating therewith, pneumatic means for moving said shears to severing position means for controlling the operation of said pneumatic means, a mechanically operated element cooperating with said pneumatic means to control the closing of said shears, and means for positively actuating said element to permit said pneumatic means to close said shears in timed relation with the operation of said feeding device.

8. Shearing mechanism for glass feeders, comprising a pair of shear blades, a fluid pressure operated piston connected to advance and close said shear blades, a stop member movable with said piston, a wedge cam movable transversely with respect to the path of movement of said stop member, and mechanically operated means for moving said wedge cam to interrupt the movement of said piston and to thereafter mechanically control further advancing movement of said piston, the said piston closing said shear blades during said further movement.

9. Shearing mechanism for glass feeders, comprising a pair of shear blades, a fluid pressure operated piston connected to advance and close said shear blades, a stop member movable with said piston, a wedge cam movable transversely with respect to the path of movement of said stop member, a rotary cam connected to reciprocate said wedge cam periodically, an air valve for actuating said piston, and means for operating said air valve in response to movement of said wedge cam.

10. Apparatus for feeding separate mold charges of molten glass, comprising glass severing shears, means for moving said shears toward and from severing position, means for controlling the operation of said shear-moving means, separate means for controlling the time of closing of said shears, and means for periodically actuating said controlling means independently of said shear-moving means.

11. In combination with a glass feeding device, shears cooperating therewith, fluid-pressure means for moving said shears into and out of severing position with respect to said feeding device and for closing said shears in the severing position, and means mechanically operated independently of said fluid-pressure means for advancing or retarding the time when the shears are closed without altering the time of commencement of the movement of the shears toward said severing position.

12. Shearing mechanism for glass feeders, comprising a pair of shear blades, a movable support for said shear blades, means for moving said support toward and from a shearing position, means for closing said shears when in said shearing position, and means operable periodically and independently of said shear-moving means for engaging said shear-moving means to regulate the speed of closing of said shears.

13. In combination with a glass feeder, a glass severing mechanism, pneumatic means for moving said severing mechanism to a severing position, a mechanically-controlled valve for initiating the motion of said severing mechanism, a mechanically controlled interrupter for regulating the speed at which the shears are closed, without changing the severing position, and mechanism for positively actuating said valve and said interrupter.

14. Shearing mechanism for glass feeders, including a reciprocable head carrying a pair of cooperating shear blades, fluid pressure means for advancing and retracting said head and said shears to and from a cutting position, means for controlling the operation of said fluid pressure means, means for closing said shears in response to advancing movement of said head, and mechanically-operated means for controlling the time at which said shear blades close, without changing the position at which said shear blades close.

15. Shearing mechanism for glass feeders, including a reciprocable head carrying a pair of cooperating shear blades, fluid pressure means for advancing and retracting said head and said shears to and from a cutting position, means for closing said shears in response to advancing movement of said head, and mechanically-operated means for controlling the time and the speed at which said shear blades close.

16. In combination with a glass feeding device, pneumatically operated shears cooperating therewith, a valve for controlling the operation of said shears, and cam-operated means for actuating said valve and also for mechanically controlling the pneumatic closing of said shears independently of the actuation of said valve.

17. In glass feeding apparatus, a pair of shear blades, means for moving said shear blades bodily as a unit to and from a definite position and for periodically closing said shear blades, and means adapted to cooperate with said moving means to adjust the time of closing of the shear blades in the cycles of bodily movement of the shear blades without changing the time of commencement of movement of said shear blades toward said definite position.

18. In glass feeding apparatus, a pair of shear blades, means for moving said shear blades bodily to and from a cutting position and for closing said shear blades when they are at said cutting position, and means for adjusting the speed of closing movement of said shear blades at said cutting position without altering the speed of movement of the shear blades toward said cutting position.

19. In glass feeding apparatus, a pair of shear blades, means for moving said shear blades bodily to and from a cutting position and for closing said shear blades when they are at said cutting position, and means operable during the continued operation of said apparatus for adjusting the speed of closing movement of said shear blades at said cutting position without altering the speed of movement of the shear blades toward said cutting position.

20. In glass feeding apparatus, a pair of shear blades, means for moving said shear blades bodily to and from a cutting station and for closing said shear blades at said cutting station, means for controlling the time of closing of said shear blades, and means for adjusting said control means to vary the time of closing of the shear blades without altering the speed of movement of the shear blades toward said cutting station or the time of commencement of movement of said shear blades toward said cutting station.

21. In glass feeding apparatus, a pair of shear blades, means for moving said shear blades bodily to and from a cutting station and for closing said shear blades at said cutting station, and means for adjusting the speed of closing of the shear blades without altering the speed of movement of the shear blades toward said cutting station or the position at which said shear blades are closed.

22. In glass feeding apparatus, a pair of shear blades, means for moving said shear blades bodily to and from a cutting station, and for closing said shear blades at said cutting station, and means for independently adjusting the speed of movement of the shear blades toward said cutting station and the speed of closing of said shear blades at the cutting station.

23. Shear mechanism for glass feeders including a reciprocable head carrying a pair of cooperating shear blades, fluid pressure means for advancing and retracting said head and said shears to and from a cutting position, means for closing said shears in response to advancing movement of said head, and mechanically operated means for adjusting the time at which said shear blades close without changing the time of beginning of the forward movements of said head.

24. In glass feeding apparatus, a pair of shear blades, operating means for closing and opening the shear blades, means for controlling the operation of said operating means, and mechanical means in addition to the aforesaid operating and controlling means for modifying the effective action of said operating means to adjust the time of closing of said shear blades.

25. In glass feeding apparatus, a pair of shear blades, pneumatic operating means for closing and opening the shear blades, means for controlling the operation of said operating means, and mechanical means for modifying the effective action of said pneumatic operating means to adjust the speed of closing of said shear blades.

Signed at Hartford, Conn., this 14th day of July 1925.

EVERETT O. HILLER.